United States Patent
Li et al.

(10) Patent No.: US 11,341,061 B2
(45) Date of Patent: May 24, 2022

(54) ADDRESS TRANSLATION METHOD, APPARATUS, AND SYSTEM

(71) Applicant: HUAWEI TECHNOLOGIES CO., LTD., Guangdong (CN)

(72) Inventors: Zhengjie Li, Shenzhen (CN); Xiaobo Kuang, Shenzhen (CN); Wei Li, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 21 days.

(21) Appl. No.: 16/992,301

(22) Filed: Aug. 13, 2020

(65) Prior Publication Data
US 2020/0371954 A1 Nov. 26, 2020

Related U.S. Application Data

(63) Continuation of application No. PCT/CN2018/118920, filed on Dec. 3, 2018.

(30) Foreign Application Priority Data

May 31, 2018 (CN) .......................... 201810550762.7

(51) Int. Cl.
G06F 12/1009 (2016.01)
G06F 9/455 (2018.01)
G06F 13/42 (2006.01)

(52) U.S. Cl.
CPC ...... *G06F 12/1009* (2013.01); *G06F 9/45558* (2013.01); *G06F 13/4282* (2013.01);
(Continued)

(58) Field of Classification Search
CPC ............. G06F 9/45558; G06F 12/1009; G06F 13/4282; G06F 2009/45583; G06F 2213/0026
See application file for complete search history.

(56) References Cited

U.S. PATENT DOCUMENTS

2008/0046679 A1 2/2008 Bennett et al.
2011/0179214 A1 7/2011 Goggin et al.
(Continued)

FOREIGN PATENT DOCUMENTS

CN 103823638 A 5/2014
CN 104285218 A 1/2015
(Continued)

OTHER PUBLICATIONS

J. Guo, S. Zou, P. Lu and J. Chen, "I/O Virtualization Design of FCoE Adapter," 2015 International Conference on Network and Information Systems for Computers, 2015, pp. 18-21, doi: 10.1109/ICNISC.2015.78. [retrieved on Oct. 28, 2021], Retrieved from https://ieeexplore.ieee.org (Year: 2015).*
(Continued)

*Primary Examiner* — Eric T Oberly
(74) *Attorney, Agent, or Firm* — WHDA, LLP

(57) ABSTRACT

This disclosure discloses an address translation method, apparatus, and system. The method includes: receiving, by a first address translation unit (ATU), an access request sent by a first virtual machine (VM), where the access request carries a first address and parameter information of the first address, and the parameter information of the first address includes an identifier of a target virtual function (VF); determining, by the first ATU, a matching relationship based on the parameter information of the first address and VF range description information in an address mapping table; and when an identifier of a target VF and the VF range description information are successfully matched, translating, by the first ATU, the first address into a second address based on the address mapping table.

20 Claims, 4 Drawing Sheets

(52) U.S. Cl.
CPC .............. *G06F 2009/45583* (2013.01); *G06F 2213/0026* (2013.01)

(56) References Cited

U.S. PATENT DOCUMENTS

| | | |
|---|---|---|
| 2011/0179414 A1 | 7/2011 | Goggin et al. |
| 2015/0220409 A1* | 8/2015 | Shao .................. G06F 11/0793 714/4.5 |
| 2015/0293873 A1 | 10/2015 | Shao et al. |
| 2015/0317089 A1 | 11/2015 | Ho |
| 2019/0065266 A1* | 2/2019 | Ding ..................... G06F 9/5077 |
| 2019/0155548 A1 | 5/2019 | Jia et al. |

FOREIGN PATENT DOCUMENTS

| | | |
|---|---|---|
| CN | 104298535 A | 1/2015 |
| CN | 105373486 A | 3/2016 |
| CN | 106371888 A | 2/2017 |
| CN | 107894913 A | 4/2018 |

OTHER PUBLICATIONS

Notice of allowance dated Nov. 17, 2020, issued in counterpart CN Application No. 201810550762.7, with English translation. (8 pages).
Cheng Hanqiang: "Research and Implementation of Hardware-assisted I/O Virtualization for Many-Core Platform", Changsha, Hunan, P.R. China, Nov. 2008. (83 pages).
Office Action dated May 7, 2020, issued in counterpart CN Application No. 201810550762.7, with English Translation. (9 pages).
International Search Report dated Feb. 27, 2019, issued in counterpart Application No. PCT/CN2018/118920, with English Translation. (13 pages).

* cited by examiner

ADDRESS TRANSLATION METHOD, APPARATUS, AND SYSTEM

CROSS-REFERENCE TO RELATED APPLICATIONS

This is a continuation of International Patent Application No. PCT/CN2018/118920, filed on Dec. 3, 2018, which claims priority to Chinese Patent Application No. 201810550762.7, filed on May 31, 2018. The disclosures of the aforementioned applications are hereby incorporated by reference in their entireties.

TECHNICAL FIELD

This disclosure relates to the field of server technologies, and in particular, to an address translation method, apparatus, and system.

BACKGROUND

With development of virtualization technologies, to improve a virtualization processing capability of a server, a system on chip (SoC) is connected to the server (for example, the SoC is connected to the server as a peripheral component interconnect express (PCIe) bus standard card), and the SoC shares a part of functions of a processor of the server, so that the SoC is used to offload the part of functions of the processor of the server.

Currently, in the server, due to a PCIe limitation, there is an address field A in the processor of the server, and there is an address field B in the SoC. The two address fields may have a same address, and the processor needs to distinguish between access objects that have the same address in the two address fields. A general method is to divide a segment of address space in the address domain A, and map an address that needs to be used in the address domain B. In PCIe, the segment of address space in the address domain A is referred to as a base address register (BAR) address segment, and the BAR address segment is divided into a plurality of BAR address intervals. An address translation unit (ATU) in the SoC is responsible for translating an address in the address field A into an address in the address field B. In a virtualization scenario, at least one virtual machine (VM) is deployed on each server. Correspondingly, in a PCIe bus, each physical function (physical function, PF) includes one or more virtual functions (VF). One or more VFs can be used for a VM. Each VF corresponds to the plurality of BAR address intervals (such as BAR 01, BAR 23, and BAR 45). Each BAR address interval may include a plurality of regions (region). Each region corresponds to an address translation unit (ATU). When the VM needs to access an address in the BAR address segment of the processor, the VM actually accesses an address in a BAR address interval corresponding to a VF. The address in the BAR address interval is mapped to a register of the SoC. The ATU in the SoC needs to be used to complete translation between the address that is in the BAR address interval corresponding to the VF and that is to be accessed by the VM and an address in the register of the SoC. The BAR address interval is an address interval in the plurality of BAR address intervals corresponding to the VF. Because each BAR address interval includes a plurality of regions, a BAR address interval of each VF correspondingly also includes the plurality of regions.

In a conventional implementation, the SoC includes a plurality of ATUs. When the VM needs to access the address in the BAR address segment of the processor and sends an access request, all ATUs receive the access request, and parse the to-be-accessed address carried in the access request. Finally, a matched ATU translates the to-be-accessed address of the VM into the address in the register. For example, there are two VMs in the system, each VM corresponds to one VF, each VF corresponds to one BAR address interval, and each BAR address interval includes two regions. In this case, four ATUs need to be configured in the SoC, to implement address translation for access requests of different VMs. As a quantity of VMs increases, a quantity of ATUs also increases. In addition, when the SoC receives an access request sent by any VM, all ATUs process the access request. This increases SoC load. Therefore, there are problems of resource waste and low processing efficiency in the foregoing ATU implementation process.

SUMMARY

This disclosure provides an address translation method, apparatus, and system, to resolve problems of resource waste and low processing efficiency in an ATU implementation process in a conventional technology. The technical solutions are as follows:

According to a first aspect, an address translation method is provided. The method includes:

receiving, by a first ATU, an access request sent by a first VM, where the access request carries a first address and parameter information of the first address; determining a matching relationship based on the parameter information of the first address and an address mapping table, where the address mapping table includes VF range description information, and the VF range description information is used to describe attributes of at least two VFs; and when determining that an identifier of a target VF and the VF range description information are successfully matched, translating, by the first ATU, the first address into a second address based on the address mapping table, where the second address is a mapping address of the first address in a SoC. The first ATU is any one of at least one ATU deployed on the SoC. The SoC is connected to a processor by using a peripheral component interconnect express PCIe bus. At least one VM runs on the processor. The first VM is any one of the at least one VM. At least one virtual function VF is allocated to each VM in the PCIe bus. A base address register BAR address interval corresponding to each VF corresponds to a segment of address interval in a register of the SoC. The BAR address interval corresponding to each VF includes at least one region (region). The first address is a to-be-accessed destination address of the first VM, and the to-be-accessed destination address is an address in a BAR address segment managed by the processor. The parameter information of the first address includes the identifier of the target VF, and the target VF is one of the at least one VF allocated to the first VM in the PCIe bus.

In this disclosure, because the VF range description information is used to describe the attributes of the at least two VFs, the first ATU may translate addresses in BAR address intervals corresponding to the at least two VFs, instead of translating only an address in a BAR address interval corresponding to a VF. Therefore, according to the address translation method provided in this disclosure, a quantity of ATUs deployed on the SoC can be reduced, and resource waste and low message processing are avoided in an ATU implementation process.

In a possible implementation, the at least two VFs have consecutive numbers, the VF range description information includes a VF start identifier and a VF quantity, the VF start identifier is a smallest number in at least two numbers corresponding to the at least two VFs, and the VF quantity is a quantity of the at least two VFs. In this case, the determining that the identifier of the target VF and the VF range description information are successfully matched includes: when the identifier of the target VF is greater than or equal to the VF start identifier and is less than a sum of the VF start identifier and the VF quantity, determining that the identifier of the target VF and the VF range description information are successfully matched.

In this disclosure, when the at least two VFs have consecutive numbers, which VFs are the at least two VFs may be determined through the VF start identifier and the VF quantity. Therefore, the VF range description information may include the VF start identifier and the VF quantity.

In another possible implementation, the VF range description information includes an identifier of each of the at least two VFs. In this case, the determining that the identifier of the target VF and the VF range description information are successfully matched includes: when the identifier of the target VF is the identifier in the VF range description information, determining that the identifier of the target VF and the VF range description information are successfully matched.

In this disclosure, the VF range description information may also directly include the identifier of each of the at least two VFs, to represent which VFs are the at least two VFs.

Optionally, the parameter information of the first address further includes a region identifier, the region identifier is used to indicate a region of the first address, the address mapping table further includes region description information, the region description information is used to describe addresses in at least two regions, the at least two regions are in a one-to-one correspondence with the at least two VFs, and the first ATU is configured to translate the addresses in the at least two regions. In this case, before the translating, by the first ATU, the first address into a second address based on the address mapping table, the method further includes: when determining that the region identifier and the region description information are successfully matched, translating, by the first ATU, the first address into the second address based on the address mapping table.

In this disclosure, before the address translation is performed on the first address, VF matching needs to be performed, and region matching further needs to be performed.

The at least two regions have a same size. Each region has a same start address. The region description information includes a region size, a first start address, a PF identifier, and an identifier of a BAR address interval. The region size is a size of any one of the at least two regions, and the first start address is a start address of any one of the at least two regions. The region identifier includes an identifier of a target PF and an identifier of a target BAR address interval. The target PF is a PF to which the target VF belongs, and the target BAR address interval is a BAR address interval to which the first address belongs. In this case, the determining that the region identifier and the region description information are successfully matched includes: when the identifier of the target PF is the same as the PF identifier in the region description information, the identifier of the target BAR address interval is the same as the identifier of the BAR address interval in the region description information, and the first address is greater than or equal to the first start address and is less than or equal to a sum of the first start address and the region size, determining that the region identifier and the region description information are successfully matched.

In this disclosure, region matching specifically includes matching in the foregoing three aspects.

The address mapping table further includes a second start address, and the second start address is a start address of a register on a SoC side when the first ATU performs address translation. In this case, the translating, by the first ATU, the first address into a second address based on the address mapping table includes: determining an address difference between the second address and the second start address based on the address mapping table, the parameter information of the first address, and the first address; and adding the determined address difference and the second start address, to obtain the second address.

Because the address mapping table further includes the second start address, when the first address needs to be translated, the difference between the second address and the second start address needs to be first determined, to determine the second address based on the determined difference.

In a possible implementation, the determining, by the first ATU, an address difference between the second address and the second start address based on the address mapping table, the parameter information of the first address, and the first address includes: determining the address difference based on the address mapping table, the parameter information of the first address, and the first address by using a preset formula. The preset formula is $\Delta=(IA-BAR\_OFFSET)+(VF\_ID-VF\_START)\times SIZE$. $\Delta$ is the address difference, IA is the first address, BAR_OFFSET is the first start address in the region description information of the address mapping table, VF_ID is the identifier of the target VF, and VF_START is the VF start identifier in the VF range description information.

In this disclosure, the address difference between the second address and the second start address may be determined by using the foregoing formula.

Optionally, the address translation method provided in this disclosure further includes: receiving and storing, by the first ATU, the address mapping table. The address mapping table is determined by the processor during initialization based on the region included in the BAR address interval corresponding to each VF and a mapping address that is of the region in the SoC and that is included in the BAR address interval corresponding to each VF.

In this disclosure, during initialization of the processor, in other words, when the address mapping table is configured for the first ATU, to subsequently receive the first address, the first ATU may translate the first address based on the address mapping table.

According to a second aspect, an address translation apparatus is provided, and is applied to a first ATU. The address translation apparatus has a function of implementing behavior of the address translation method in the first aspect. The address translation apparatus includes at least one module, and the at least one module is configured to implement the address translation method provided in the first aspect.

According to a third aspect, an address translation system is provided. The system includes a processor and a SoC. The SoC is connected to the processor by using a PCIe bus. The SoC includes a first address translation unit. When the system runs, the first ATU may perform the address translation method according to the first aspect.

According to a fourth aspect, a SoC is provided. The SoC is connected to a processor by using a PCIe bus, the SoC includes a first address translation unit, and a first ATU is configured to perform the address translation method according to the first aspect.

According to a fifth aspect, a computer-readable storage medium is provided. The computer-readable storage medium stores an instruction, and when the instruction is run on a computer, the computer is enabled to perform the address translation method according to the first aspect.

According to a sixth aspect, a computer program product including an instruction is provided. When the computer program product runs on a computer, the computer is enabled to perform the address translation method according to the first aspect.

Technical effects achieved in the second aspect, the third aspect, the fourth aspect, the fifth aspect, and the sixth aspect are similar to technical effects achieved by using corresponding technical means in the first aspect. Details are not described herein again.

The technical solutions provided in this disclosure have the following beneficial effects.

In this disclosure, the first ATU receives the access request sent by the first VM. The access request carries the first address and the parameter information of the first address. The parameter information of the first address includes the identifier of the target VF. The first ATU determines the matching relationship based on the parameter information of the first address and the VF range description information in the address mapping table. When the identifier of the target VF and the VF range description information are successfully matched, the first ATU translates the first address into the second address based on the address mapping table. Because the VF range description information is used to describe attributes of the at least two VFs, in this disclosure, the first ATU may translate addresses in BAR address intervals corresponding to the at least two VFs, instead of translating only an address in a BAR address interval corresponding to a VF. Therefore, according to the address translation method provided in this disclosure, a quantity of ATUs deployed on the SoC can be reduced and resource waste and low processing efficiency are avoided in an ATU implementation process.

DESCRIPTION OF EMBODIMENTS

To make the objectives, technical solutions, and advantages of this disclosure clearer, the following further describes the implementations of this disclosure in detail with reference to the accompanying drawings.

Before the embodiments of this disclosure are described in detail, an application background of this disclosure is first described.

With development of cloud technologies, a plurality of VMs are usually deployed on a server, and the server may provide services for different tenants by using different VMs. In addition, as use duration of the server increases, a quantity of the VMs deployed on the server also increases, and consequently, more data is stored in the server. Therefore, the data stored in the server usually needs to be transferred, to offload a function of a processor of the server. This reduces data processing pressure of the server. An implementation of transferring the data stored in the server is: The SoC is connected to the server by using a PCIe bus, and the server accesses memory space in the SoC by using the PCIe bus, and transfers the data stored in the server to the SoC. The address translation method provided in this disclosure is applied to a scenario in which the server needs to access the memory space in the SoC in a process in which the server transfers the data stored in the server to the SoC.

Figure 1:
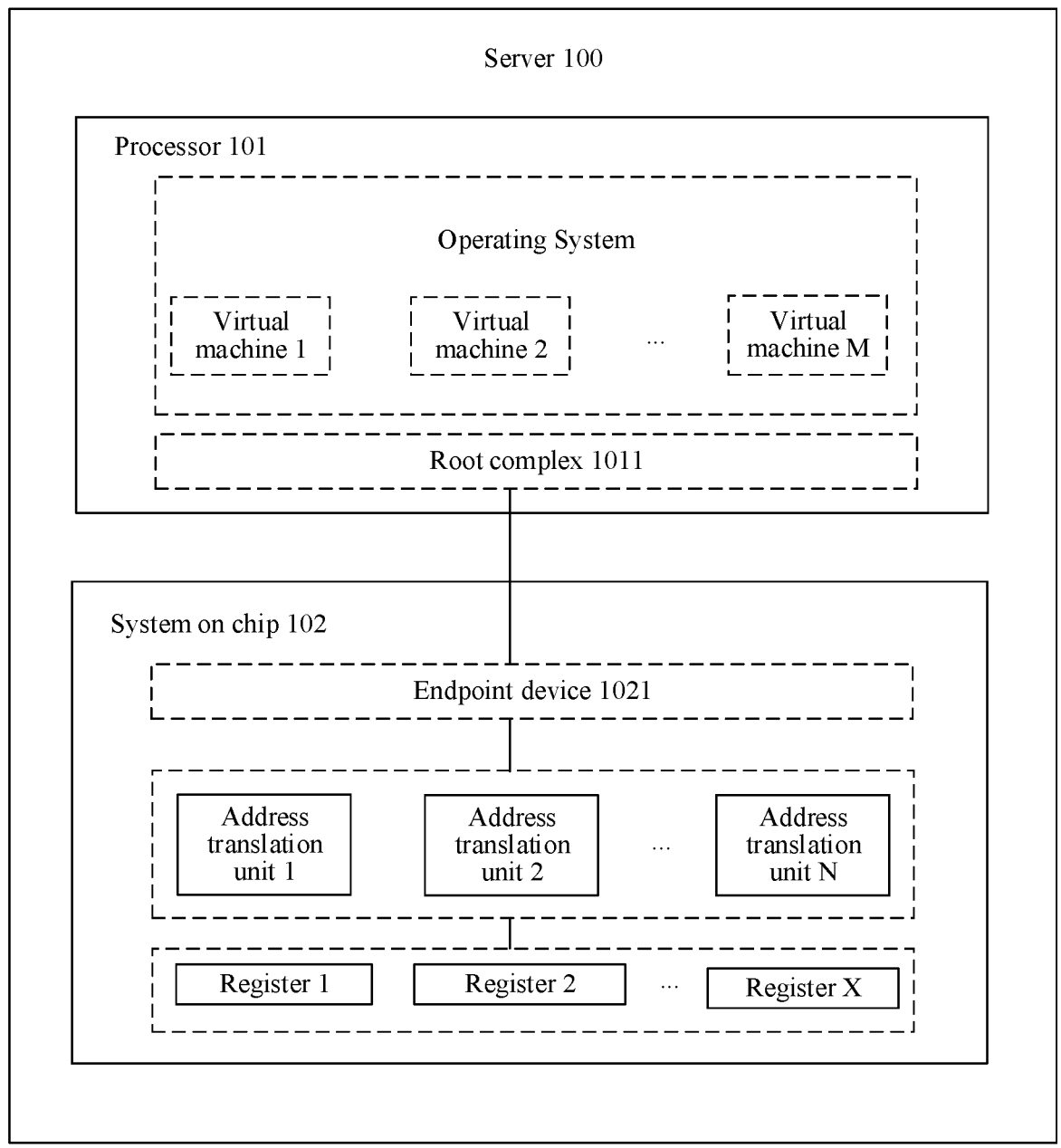
FIG. 1 is a schematic diagram of a server according to an embodiment of this disclosure.

FIG. 1 is a schematic diagram of a server according to an embodiment of this disclosure. As shown in FIG. 1, the server 100 includes a processor 101 and a SoC 102 that is inserted into the server 100 by using a PCIe bus. In other words, the SoC 102 is connected to the processor by using the PCIe bus. The PCIe bus includes a root complex 1011 and an endpoint device 1021. The root complex 1011 is deployed on the processor 101, and the endpoint device 1021 is deployed on the SoC 102. The root complex 1011 is connected to the endpoint device 1021 in a wireless or wired manner for communication.

As shown in FIG. 1, an operating system (Operating System) runs on the processor 101, at least one VM runs on the operating system, at least one VF is allocated to each VM in the root complex 1011 of the PCIe bus, each VF corresponds to one BAR address interval, each BAR address interval includes at least one BAR address interval, and each BAR address interval includes at least one region. The SoC 102 includes at least one register. Each region in the BAR address interval of each VF on the root complex 1011 has a corresponding mapping address in the register, in other words, the region has a corresponding mapping address on a SoC side.

In addition, in a conventional technology, a corresponding ATU is set for each region in the BAR address interval of each VF on the root complex 1011 in the SoC 102, and each ATU is deployed on the endpoint device 1021. In other words, if there are N regions in BAR address intervals of all VFs on the root complex 1011, N ATUs are deployed on the SoC 102.

An address mapping table is set for any one of the N ATUs. The address mapping table is used to describe an address translation range set for the ATU. When the VM initiates access to an address, the operating system determines whether the address belongs to an address in a BAR address segment managed by the processor. If the address belongs to the address in the BAR address segment managed by the processor, the operating system sends the address to the root complex 1011, and the root complex 1011 forwards the address to the endpoint device 1021. When the endpoint device 1021 receives the address, each ATU deployed on the endpoint device 1021 matches the address based on the address mapping table of the ATU. If an ATU determines that the address matches the address mapping table of the ATU, the ATU translates the address, so that the SoC 102 accesses a translated address.

It should be noted that, in the conventional technology, one ATU is set for each region in the BAR address interval corresponding to each VF, in other words, each ATU can translate an address only in one region. Therefore, a large quantity of ATUs need to be deployed, and hardware resources are wasted. Therefore, in this embodiment of this disclosure, each ATU is configured to translate addresses in regions in BAR address intervals of at least two VFs. This reduces the quantity of ATUs to be deployed on the endpoint.

The ATU may be implemented by using a hardware unit, or may be implemented by using a software unit. In FIG. 1, an example in which the ATU is implemented by using the hardware unit is used for description. In addition, the server 100 may be a device such as an X86 server or an ARM server. This is not specifically limited in this embodiment of this disclosure.

It should be noted that in this embodiment of this disclosure, there is no correspondence among a quantity of VMs, the quantity of ATUs, and a quantity of registers. In FIG. 1, only M VMs, the N ATUs, and X registers are used as examples for description, and do not constitute a limitation on the quantity of VMs, the quantity of ATUs, and the quantity of registers in this disclosure. M, N, and X are all positive integers greater than or equal to 1.

Figure 2:
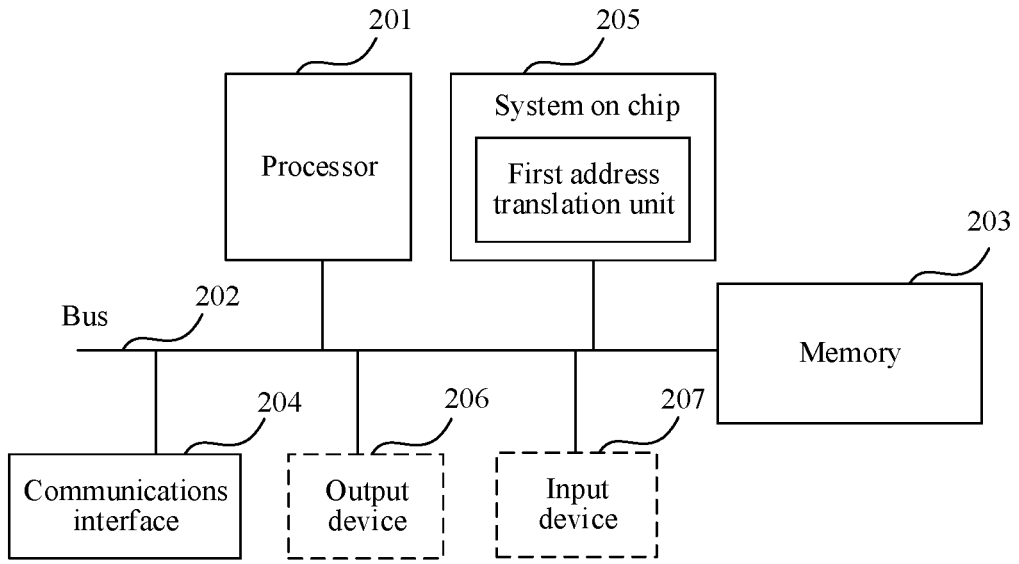
FIG. 2 is a schematic structural diagram of a computer device according to an embodiment of this disclosure.

FIG. 2 is a schematic structural diagram of a computer device according to an embodiment of this disclosure. The server in FIG. 1 may be implemented by using the computer device in FIG. 2. Referring to FIG. 2, the computer device includes at least one processor 201, a bus 202, a memory 203, and at least one communications interface 204.

The processor 201 may be a general-purpose central processing unit (CPU), a microprocessor, an application-specific integrated circuit (ASIC), or one or more integrated circuits configured to control program execution in the solutions of this disclosure. Each processor may be a single-core (single-CPU) processor, or may be a multi-core (multi-CPU) processor. The processor herein may be one or more devices, circuits, and/or processing cores for processing data (for example, a computer program instruction).

In this embodiment of this disclosure, as shown in FIG. 2, the processor 201 is further connected to a system on chip SoC 205 by using the bus. For example, the SoC 205 is connected to the server in FIG. 2 in a form of a PCIe bus standard card. At least one ATU is deployed on the SoC 205. A first ATU is configured to perform the address translation method provided in this embodiment of this disclosure, and the first ATU is any one of the at least one ATU.

The bus 202 may include a channel, used to transmit information among the foregoing components. The bus 202 may further include a power bus, a control bus, a status signal bus, and the like, in addition to a data bus. However, for clear description, various types of buses in the figure are marked as the bus 202.

The memory 203 may be a read-only memory (ROM) or another type of static storage device capable of storing static information and an instruction, or a random access memory (RAM) or another type of dynamic storage device capable of storing information and an instruction, or may be an electrically erasable programmable read-only memory (EE-PROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium capable of carrying or storing expected program code in a form of instructions or data structures and capable of being accessed by a computer. However, the memory 203 is not limited thereto. The memory 203 may exist independently, and be connected to the processor 201 by using the communications bus 202. Alternatively, the memory 203 may be integrated into the processor 201.

The communications interface 204 may be any apparatus like a transceiver, and is configured to communicate with another device or communications network, such as Ethernet, a radio access network (RAN), or a wireless local area network (WLAN).

In specific implementation, in an embodiment, the computer device may further include an output device 206 and an input device 207. The output device 206 communicates with the processor 201, and may display information in a plurality of manners. For example, the output device 206 may be a liquid crystal display (LCD), a light emitting diode (LED) display device, a cathode ray tube (CRT) display device, a projector (projector), or the like. The input device 207 communicates with the processor 201, and may receive an input from a user in a plurality of manners. For example, the input device 207 may be a mouse, a keyboard, a touchscreen device, or a sensing device.

The computer device may be a general-purpose computer device or a dedicated computer device. In specific implementation, the computer device may be a device such as an X86 server or an ARM server. A type of the computer device is not limited in this embodiment of this disclosure.

The following describes the address translation method provided in this embodiment of this disclosure.

It can be learned from the server in FIG. 1 that the plurality of ATUs are deployed on the endpoint device. Because implementations of performing address translation by the ATUs are basically the same, in the following embodiment, the address translation method provided in this disclosure is described in detail by using the first ATU as an example. For other implementations of performing address translation by the ATU, refer to the address translation method provided in the following embodiment. The first ATU is one of the plurality of ATUs deployed on the endpoint device.

Figure 3:
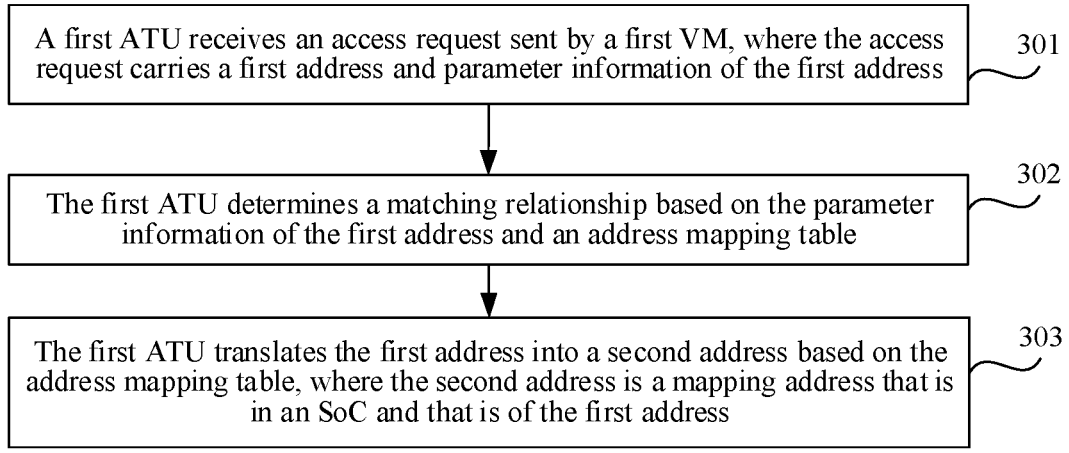
FIG. 3 is a flowchart of an address translation method according to an embodiment of this disclosure.

FIG. 3 is a flowchart of an address translation method according to an embodiment of this disclosure. The method is applied to a first ATU. As shown in FIG. 3, the method includes the following steps.

Step 301: A first ATU receives an access request sent by a first VM, where the access request carries a first address and parameter information of the first address.

In this embodiment of this disclosure, when a VM on a server needs to access an address in a processor, the VM actually accesses the address by using an operating system of the server. In addition, an address interval on a processor side actually includes two parts. One part of the address interval is used to describe a local address of the server, and the other part of the address interval is used to perform map with an address on a SoC. For ease of description, the address interval used to describe the local address of the server is referred to as a first-type address interval, and the address interval used to perform map with the address in the SoC is referred to as a second-type address interval.

Therefore, an implementation in which the first ATU receives the access request sent by the first VM is as follows: The first VM sends the access request to the operating system. The access request carries the to-be-accessed first address and the parameter information of the first address. When receiving the access request, the operating system determines whether the first address is an address in the second-type address interval, and if the first address is the address in the second-type address interval, forwards the access request to a root complex. When receiving the access request, the root complex determines an address that is in the SoC and that the operating system currently needs to access. Then, the root complex forwards the access request to an endpoint device in a PCIe bus, and each ATU deployed on the endpoint device receives the access request. When the first address is not the address in the second-type address interval, but is an address in the first-type address interval, it indicates that the address that the first VM currently needs to access is the local address of the server. In this case, the operating system may directly access the first address.

It should be noted that, when a plutality of SoCs are inserted into the server, each SoC in the PCIe bus corresponds to one endpoint device. In this case, when receiving the access request, the root complex may determine, based on the first address carried in the access request, an address that is on a specific SoC and that the operating system currently needs to access, to forward the access request to a corresponding endpoint device in the SoC.

The first ATU is any one of at least one ATU deployed on the SoC, and the first VM is any one of at least one VM running on the processor. It should be noted that, after the first VM initiates the access request, if the first address is the address in the second-type address interval, each ATU in the SoC receives the access request. Because each ATU processes the access request in a same manner, the first ATU is used as an example for description herein.

In addition, the parameter information of the first address is used to describe other related information of the first address. In a possible implementation, because the first address is carried in the access request initiated by the first VM, the parameter information of the first address includes an identifier of a target VF, and the target VF is one of at least one VF allocated to the first VM in the PCIe bus.

Further, the parameter information of the first address further includes a region identifier, and the region identifier is used to indicate a region of the first address. The region identifier includes an identifier of a target PF and an identifier of a target BAR address interval. The target PF is a PF to which the target VF belongs, and the target BAR address interval is a BAR address interval to which the first address belongs. In other words, the target PF is used in the access to the first address.

In addition, in this embodiment of this disclosure, because an address mapping table is preset for the first ATU, the address mapping table is used to describe an address translation range set for the first ATU and an address that is in the SoC and that is mutually mapped to the address translation range. For ease of subsequent description, a mapping relationship between an address on a server side and an address on a SoC side is first described herein.

Currently, a number is set for each VF on the server, and the number may be used to uniquely identify a VF. Each of at least one BAR address interval of any VF also has a corresponding number, and the number of each BAR address interval is sequentially numbered based on a quantity of BAR address intervals included in the VF. Each region in any BAR address interval of a VF is sequentially numbered based on a quantity of regions included in the BAR address interval. For example, two VMs run on the processor, each VM corresponds to one VF, and the two VFs belong to a same PF. The two VMs may be marked as a VF 1 and a VF 2, respectively. The VF 1 corresponds to two BAR address intervals, which may be marked as a BAR (0) and a BAR (1), respectively. The VF 2 also corresponds to two BAR address intervals, which may also be marked as a BAR (0) and a BAR (1), respectively. The BAR (0) of the VF 1 includes two regions, which are marked as a region 1 and a region 2, respectively. The BAR (0) of the VF 2 also includes two regions, which may also be marked as a region 1 and a region 2.

Address intervals corresponding to two adjacent regions included in any BAR address interval may be consecutive address intervals, to be specific, an end address of a previous region and a start address of a next region are two consecutive addresses. Certainly, the address intervals corresponding to the two adjacent regions included in any BAR address interval may also be discontinuous address intervals, to be specific, there is another address between the end address of the previous region and the start address of the next region. This is not specifically limited in this embodiment of this disclosure.

In addition, for a plurality of VFs with consecutive numbers, in regions included in BAR address intervals with a same number, regions with a same number are usually used to implement a same service. Different regions that are used to implement the same service means that operations performed by the processor after accessing addresses in the different regions are basically the same, for example, all operations are data read operations or all operations are data write operations. In addition, for each region in each BAR address interval of each VF on the server, a mapping address that is on the SoC side and that is of the region has the following characteristic: If some of regions included in BAR address intervals of different VFs are used to implement the same service, mapping addresses that are on the SoC side and that are of the regions are a segment of consecutive address intervals. In other words, for the several VFs with the consecutive numbers, in the regions included in the BAR address intervals with the same number, mapping addresses that are on the SoC side and that are of the regions with the same number are the segment of consecutive address intervals.

Figure 4:
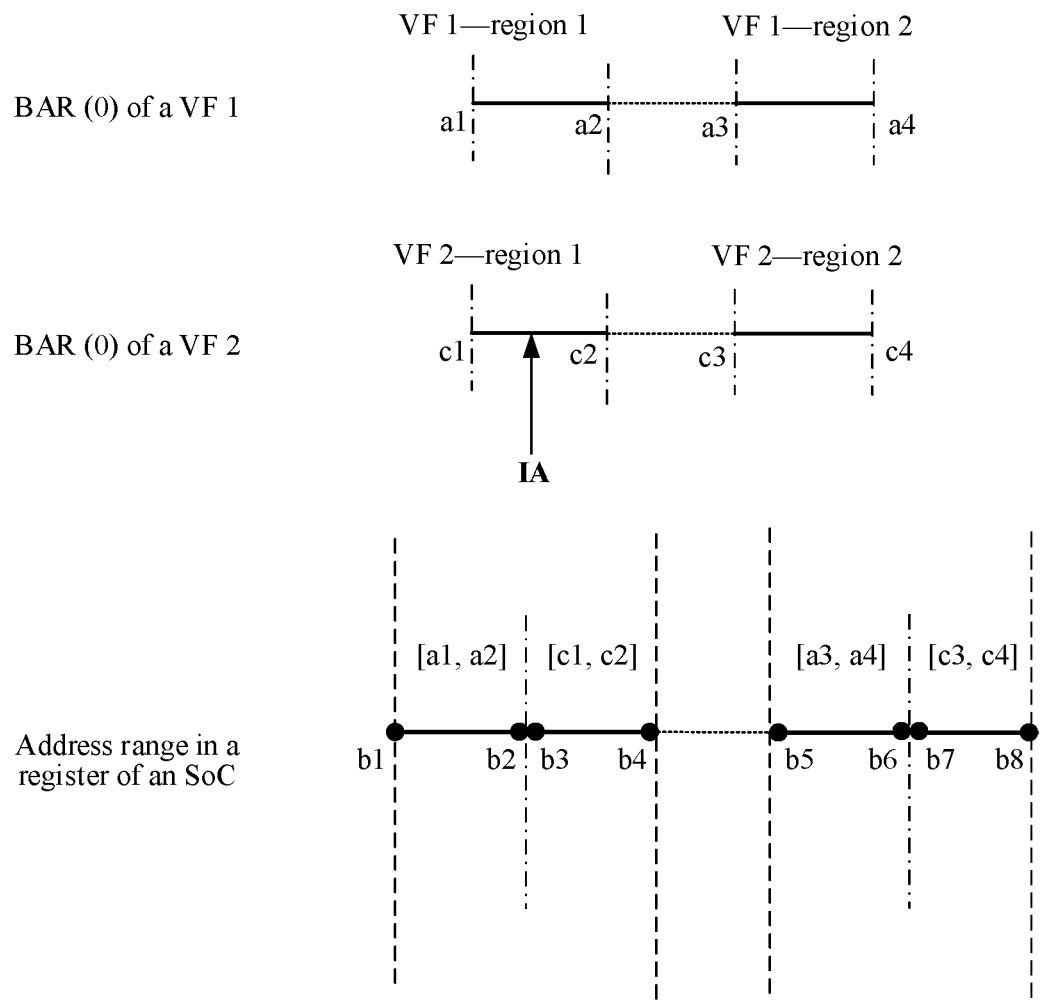
FIG. 4 is a schematic diagram of a mapping relationship according to an embodiment of this disclosure.

FIG. 4 is a schematic diagram of a mapping relationship according to an embodiment of this disclosure. If two VMs run on a server, each VM corresponds to one VF, and the two VFs are marked as a VF 1 and a VF 2, respectively. Each VF includes one BAR address interval, and the two BAR address intervals are marked as a BAR (0) of the VF 1 and a BAR (0) of the VF 2, respectively. The BAR address interval of each VF includes two regions. Two regions included in the BAR (0) of the VF 1 are marked as a VF 1-region 1 and a VF 1-region 2, respectively. Two regions included in the BAR (0) of the VF 2 are marked as aVF 2-region 1 and aVF 2-region 2, respectively. As shown in FIG. 4, an address interval of the VF 1-region 1 is [a1, a2], and the address interval is mapped to an address interval [b1, b2] in a register of a SoC. An address interval of the VF 2-region 1 is [c1, c2], and the address interval is mapped to an address interval [b3, b4] in the register of the SoC. An address interval of the VF 1-region 2 is [a3, a4], and the address interval is mapped to an address interval [b5, b6] in the register of the SoC. An address interval of the VF 2-region 2 is [c3, c4], and the address interval is mapped to an address interval [b7, b8] in the register of the SoC. It should be noted that, because the VF 1-region 1 and the VF 2-region 1 are usually used to implement the same service, the address intervals to which the VF 1-region 1 and the VF 2-region 1 are mapped in the register of the SoC are set as consecutive address intervals, to be specific, b2 and b3 are two consecutive addresses. Because the VF 1-region 2 and the VF 2-region 2 are usually used to implement the same service, the address intervals to which the VF 1-region 2 and the VF 2-region 2 are mapped in the register of the SoC are set as consecutive address intervals, to be specific, b6 and b7 are two consecutive addresses.

In this embodiment of this disclosure, based on the foregoing mapping relationship, to reduce a quantity of ATUs deployed on an endpoint, a first ATU is configured to translate addresses in at least two regions. The at least two regions respectively belong to at least two VFs on the server, and the at least two regions are used to implement the same service. In other words, mapping addresses that are on the SoC side and that are of the at least two regions set for the first ATU are a segment of consecutive address intervals.

Because the first ATU is configured to translate the addresses in the at least two regions, the address mapping table of the first ATU needs to include VF range description information. The VF range description information is used to describe attributes of the at least two VFs. In this embodiment of this disclosure, the VF range description information may be specifically represented in the following three forms.

In a first representation form, the VF range description information includes a VF start identifier and a VF quantity. The VF start identifier is a smallest number in at least two numbers corresponding to the at least two VFs, and the VF quantity is a quantity of the at least two VFs. Specifically, the VF range description information may include VF_START and VF_NUM. VF_START is used to mark the start identifier of the VF, and VF_NUM is used to identify the VF quantity. For example, when VF_START=2 and VF_NUM=3, the at least two VFs are a VF 2, a VF 3, and a VF 4.

In a second representation form, the VF range description information includes the VF start identifier and a VF end identifier. The VF end identifier is a largest number in the at least two numbers corresponding to the at least two VFs. Specifically, the VF range description information may include VF_START and VF_END. VF_START is used to mark the VF start identifier, and VF_END is used to mark a VF end identifier. For example, when VF_START=2 and VF_END=5, the at least two VFs are aVF 2, aVF 3, aVF 4, and aVF 5.

In a third representation form, the VF range description information includes an identifier of each of the at least two VFs.

Certainly, in this embodiment of this disclosure, the VF range description information may alternatively be represented in another form. It only needs to be ensured that which VFs can be determined as the at least two VFs through the VF range description information.

In addition, the VF range description information can only be used to describe which VFs are the at least two VFs corresponding to the at least two regions, but cannot clearly determine specific locations of the at least two regions. Therefore, the address mapping table of the first ATU further includes region description information. The region description information is used to describe addresses of the at least two regions, and the at least two regions are in a one-to-one correspondence with the at least two VFs, the first ATU is configured to perform address translation on the addresses in the at least two regions.

It should be noted that each PF includes one or more VFs. One or more VFs can be used for a VM. Each VF corresponds to a plurality of BAR address intervals. Therefore, to determine the specific locations of the at least two regions, the region description information may include a PF identifier and an identifier of a BAR address interval, so that which regions in specific BAR address intervals of specific VFs can be determined as the at least two regions and PFs of the at least two VFs can be determined through the region description information and the VF range description information.

In addition, it should be noted that when the at least two regions are used to implement the same service, the at least two regions have a same size, and start addresses of the regions are the same. Therefore, the region description information further includes a region size and a first start address. The region size is a size of any one of the at least two regions, and the first start address is a start address of any one of the at least two regions, so that specific locations of the at least two regions can be determined through the region description information and the VF range description information. The region size may be marked as SIZE, and the first start address may be marked as BAR_OFFSET.

In addition, because the mapping addresses that are on the SoC side and that are of the at least two regions are the segment of consecutive address intervals, the address mapping table of the first ATU further includes a second start address. The second start address is a start address on the SoC side when the first ATU performs address translation. The second start address may be marked as DST_BASE.

For example, the at least two regions are the VF 1-region 1 and the VF 2-region 1 in FIG. 4. Address represented by a1 and c1 are the same, and an interval length of the address interval [a1, a2] is the same as an interval length of the address interval [c1, c2]. The VF start identifier VF_START=1 and the quantity VF_NUM=2, which are included in the address mapping table of the first ATU. The region size SIZE is the interval length of the address interval [a1, a2] or the interval length of the address interval [c1, c2]. The first start address BAR_OFFSET is a1 or c1, and the second start address DST_BASE is b1.

It should be noted that, in this embodiment of this disclosure, there is a reference address in an address segment managed by the processor, and all other addresses in the address segment managed by the processor are recorded as offset addresses relative to the reference address.

The address mapping table includes the VF range description information, the region description information, and the second start address. Optionally, in this embodiment of this disclosure, the address mapping table may include only the VF range description information, the first start address and the second start address in the region description information. In this case, the first ATU is configured to perform address translation on all regions in the at least two VFs.

In addition, the address mapping table of the first ATU is set during initialization of the server. Specifically, an implementation of setting the address mapping table of the first ATU is: when the server is initialized, determining regions included in BAR address intervals of VFs on the server, and determining mapping addresses that are on the SoC side and that are of the regions. The at least two VFs set for the first ATU are determined based on the regions included in the BAR address intervals of the VFs and the mapping address that are on the SoC side and that are of the regions, and the VF range description information is generated based on the determined at least two VFs. Further, the at least two regions that are in a one-to-one correspondence with the at least two VFs are determined, the region description information is generated based on the at least two regions, and then the address mapping table of the first ATU is determined based on the VF range description information, the region description information, and the mapping addresses that are on the SoC side and that are of the at least two regions. After determining the address mapping table of the first ATU, the server sends the address mapping table to the first ATU by using the root complex in the PCIe bus. When receiving the address mapping table, the first ATU stores the address mapping table, to subsequently translate the first address based on the address mapping table. In other words, during initialization of the server, an address mapping table of each ATU in the SoC is determined, and the address mapping table of each ATU is sent to a corresponding ATU, so that the corresponding ATU stores the address mapping table.

The first ATU is configured to perform address translation on regions in BAR address intervals of the at least two VFs. Therefore, according to the address translation method provided in this embodiment of this disclosure, the quantity of ATUs deployed on the SoC can be reduced.

For example, 64 VMs run on the processor, each VM uses one VF, the 64 VFs belong to a same PF, the BAR address interval of each VF includes one BAR address interval, and each BAR address interval includes two regions. The two regions included in the BAR address interval of each VF are marked as a region 1 and a region 2, respectively. It is assumed that regions 1 of all VFs are used to implement a same service, and regions 2 of all VFs are also used to implement a same service. In related technologies, 128 (64×2) ATUs need to be deployed on the SoC. However, according to the address translation method provided in this embodiment of this disclosure, address translation may be performed by using one ATU for all regions 1 of the 64 VFs, and address translation may be performed by using one ATU for all regions 2 of the 64 VFs. In this way, only two ATUs need to be deployed on the SoC, and compared with that 128 ATUs need to be deployed on a related technology, the quantity of deployed ATUs is greatly reduced, and resource waste and low message processing are reduced in an ATU implementation process.

Step 302: The first ATU determines a matching relationship based on the parameter information of the first address and the address mapping table.

Specifically, step 302 may be implemented by using the following two steps:

Step 3021: Determine whether the identifier of the target VF and VF range description information are matched.

For ease of subsequent description, a process of determining whether the identifier of the target VF and the VF range description information are matched is referred to as VF matching.

It can be learned from step 301 that the VF range description information has three representation forms. Therefore, correspondingly, there are also the following three implementations of performing VF matching on the first address based on the identifier of the target VF and the VF range description information.

In the first representation form of the VF range description information in step 301, an implementation of performing VF matching on the first address based on the identifier of the target VF and the VF range description information may be: determining whether the identifier of the target VF is greater than or equal to the VF start identifier and is less than a sum of the VF start identifier and the quantity; if the identifier of the target VF is greater than or equal to the VF start identifier and is less than the sum of the VF start identifier and the quantity, determining that the identifier of the target VF and the VF range description information are successfully matched; and if the identifier of the target VF is not greater than or equal to the VF start identifier and is not less than the sum of the VF start identifier and the quantity, determining that the identifier of the target VF and the VF range description information are not matched.

In the second representation form of the VF range description information in step 301, an implementation of performing VF matching on the first address based on the identifier of the target VF and the VF range description information may be: determining whether the identifier of the target VF is greater than or equal to the VF start identifier and less than or equal to the VF end identifier; if the identifier of the target VF is greater than or equal to the VF start identifier and less than or equal to the VF end identifier, determining that the identifier of the target VF and the VF range description information are successfully matched; and if the identifier of the target VF is not greater than or equal to the VF start identifier and not less than or equal to the VF end identifier, determining that the identifier of the target VF and the VF range description information are not matched.

In the third representation form of the VF range description information in step 301, an implementation of performing VF matching on the first address based on the identifier of the target VF and the VF range description information may be: determining whether the identifier of the target VF is one of the identifiers included in the VF range description information; if the identifier of the target VF is one of the identifiers included in the VF range description information, determining that the identifier of the target VF and the VF range description information are successfully matched; and if the identifier of the target VF is not one of the identifiers included in the VF range description information, determining that the identifier of the target VF and the VF range description information are not matched.

By using step 3021, it may be determined whether the target VF is in the at least two VFs set for the first ATU. If it is determined that the target VF is in the at least two VFs, the first ATU may perform information matching on the first address in other aspects by using the following step 3022.

Step 3022: Determine whether the region identifier in the parameter information of the first address and the region description information in the address mapping table are successfully matched.

It can be learned from step 301 that the parameter information of the first address includes the region identifier, and the region identifier includes the identifier of the target PF and the identifier of the target BAR address interval. In addition, the region description information in the address mapping table of the first ATU includes the region size, the first start address, the PF identifier, and the identifier of the BAR address interval. Therefore, an implementation of step 303 may be: determining whether the identifier of the target PF is the same as the PF identifier in the region description information, and if the identifier of the target PF is the same as the PF identifier in the region description information, determining that the PF identifier is successfully matched; determining whether the identifier of the target BAR address interval is the same as the identifier of the BAR address interval in the region description information, and if the identifier of the target BAR address interval is the same as the identifier of the BAR address interval in the region description information, determining that the BAR address interval identifier is successfully matched; and determining whether the first address is greater than or equal to the first start address and is less than or equal to a sum of the first start address and the region size, and if the first address is greater than or equal to the first start address and is less than or equal to the sum of the first start address and the region size, determining that the address interval matching succeeds.

In other words, in this embodiment of this disclosure, determining whether the region identifier in the parameter information of the first address and the region description information in the address mapping table are successfully matched mainly includes information matching in three aspects: PF identifier matching, BAR address interval identifier matching, and address interval matching. When it is determined, in the foregoing implementation, that the information matching in the three aspects succeeds, it indicates that the region identifier in the parameter information of the first address and the region description information in the address mapping table are successfully matched. When the information matching in any one of the three aspects fails, it indicates that the region identifier in the parameter information of the first address and the region description information in the address mapping table are not matched.

There is no execution sequence for the information matching of the PF identifier matching, the BAR address interval identifier matching, and the address interval matching, and there is no execution sequence between step 3021 and step 3022. The first ATU may first perform step 3021 and then perform step 3022, or may first perform step 3022 and then perform step 3021. Certainly, alternatively, step 3021 and step 3022 may be simultaneously performed. This is not specifically limited in this embodiment of this disclosure.

When it is determined, by using step 302, that the identifier of the target VF and the VF range description information are successfully matched, and it is determined that the region identifier and the region description information are successfully matched, it indicates that the first address is within the address translation range set for the first ATU. In this case, address translation may be performed on the first address by using the following step 303. When any one of the VF matching and the region matching is not successfully matched, it indicates that the first address is not within the address translation range set for the first ATU. In this case, the first ATU does not need to perform any operation.

It should be noted that step 3021 and step 3022 are used as examples to describe how the first ATU determines the matching relationship based on the parameter information of the first address and the address mapping table. Optionally, when the address mapping table of the first ATU only includes the VF range description information, the first start address and the second start address in the region description information, the first ATU needs to determine the matching relationship between the parameter information of the first address and the address mapping table only based on step 3021, in other words, when determining that the identifier of the target VF and the VF range description information are successfully matched, the first ATU may perform address translation by using the following step 303.

Step 303: The first ATU translates the first address into a second address based on the address mapping table, where the second address is a mapping address that is in the SoC and that is of the first address.

It can be known from step 301 that, the address mapping table of the first ATU further includes a second start address, and the second start address is a start address on the SoC side when the first ATU performs address translation. In addition, it can be known from step 301 that, the mapping addresses that are on the SoC side and that is of the at least two regions set for the first ATU are the segment of consecutive address intervals. Therefore, an implementation of step 303 may be: determining an address difference between the second address and the second start address based on the address mapping table, the parameter information of the first address, and the first address, and adding the determined address difference and the second start address, to obtain the second address.

In addition, because the at least two regions have the same size, and the start addresses of the regions are the same, an implementation of determining the address difference between the second address and the second start address based on the address mapping table, the parameter information of the first address, and the first address may be: determining the address difference based on the address mapping table, the parameter information of the first address, and the first address by using a preset formula. The preset formula is $\Delta=(IA-BAR\_OFFSET)+(VF\_ID-VF\_START)\times SIZE$. $\Delta$ is the address difference, IA is the first address, BAR_OFFSET is the first start address in the region description information, VF_ID is the identifier of the target VF in the parameter information of the first address, and VF_START is the VF start identifier in the VF range description information.

The address translation method provided in this embodiment of this disclosure is further described in detail below by using FIG. 4 as an example. If the at least two regions set for the first ATU are the VF 1-region 1 and the VF 2-region 1, the VF range description information in the address mapping table of the first ATU includes VF_START and VF_NUM, where VF_START=1 and VF_NUM=2. The region description information in the address mapping table of the first ATU includes: SIZE, BAR_OFFSET, the PF identifier, and the BAR address interval identifier. SIZE is the interval length of the address interval [a1, a2] or the interval length of the address interval [c1, c2]. BAR_OFFSET is a1 or c1. The BAR address interval identifier is the BAR (0), and it is assumed that the PF identifier is a PF 4. The address mapping table of the first ATU further includes DST_BASE, where DST_BASE is b1. In other words, the address mapping table of the first ATU includes the information: VF_START, VF_NUM, SIZE, BAR_OFFSET, the PF identifier, the identifier of the BAR address interval, and DST_BASE.

As shown in FIG. 4, when the first ATU receives the access request, the first address in the access request is marked as IA shown in FIG. 4, the identifier of the target VF included in the parameter information of the first address is the VF 2, the identifier of the target BAR address interval is the BAR (0), and the identifier of the target PF is the PF 4. Specifically, that the first ATU performs address translation on IA in FIG. 4 includes the following two steps:

(1) Perform information matching on IA.

That perform information matching on IA includes content in two aspects. In a first aspect, whether the identifier of the target VF and the VF range description information are matched is determined. In a second aspect, whether the region identifier in the parameter information of the first address and the region description information in the address mapping table are successfully matched is determined.

A specific process of the first aspect is: determining that a sum of VF_START and VF_NUM is 3, and because a number 2 corresponding to the VF 2 is greater than 1 and less than 3, determining that the identifier of the target VF and the VF range description information are successfully matched.

A specific process of the second aspect is as follows: because the identifier of the target BAR address interval is the BAR (0), and the identifier of the target PF is the PF 4, which are exactly the identifier of the BAR address interval and the PF identifier in the address mapping table, determining that the BAR matching and the PF matching succeed. In addition, as shown in FIG. 4, IA is greater than c1 and less than a sum of c1 and SIZE. Therefore, address matching also succeeds. Therefore, it may be determined that the region identifier in the parameter information of the first address and the region description information in the address mapping table are successfully matched.

Because the content in the foregoing two aspects is successfully matched, the first ATU may perform address translation on IA by using step (2).

(2) Perform address translation on IA.

Specifically, $\Delta=(IA-c1)+(2-1)\times(c2-c1)=(IA-c1)+(c2-c1)$ is determined according to the preset formula $\Delta=(IA-BAR\_OFFSET)+(VF\_ID-VF\_START)\times SIZE$. The second address may be obtained based on DST_BASE: The second address=DST_BASE+(IA-c1)+(c2-c1).

In addition, the access request initiated by the first VM may be a read request or a write request. Therefore, after the first ATU translates the first address into the second address, the SoC may perform corresponding processing based on the access request. For example, when the access request is the read request, the SoC obtains data corresponding to the second address and returns the data to the processor. When the access request is the write request, the SoC stores the to-be-written data in a storage region corresponding to the second address.

In this disclosure, the first ATU receives the access request sent by the first VM. The access request carries the first address and the parameter information of the first address. The parameter information of the first address includes the identifier of the target VF. The first ATU determines the matching relationship based on the parameter information of the first address and the VF range description information in the address mapping table. When the identifier of the target VF and the VF range description information are successfully matched, the first ATU translates the first address into the second address based on the address mapping table. Because the VF range description information is used to describe attributes of the at least two VFs, in this embodiment of this disclosure, the first ATU may translate addresses in BAR address intervals corresponding to the at least two VFs, instead of translating only an address in a BAR address interval corresponding to a VF. Therefore, according to the address translation method provided in this disclosure, the quantity of ATUs can be reduced, and resource waste and low processing efficiency are avoided in an ATU implementation process.

Figure 5:
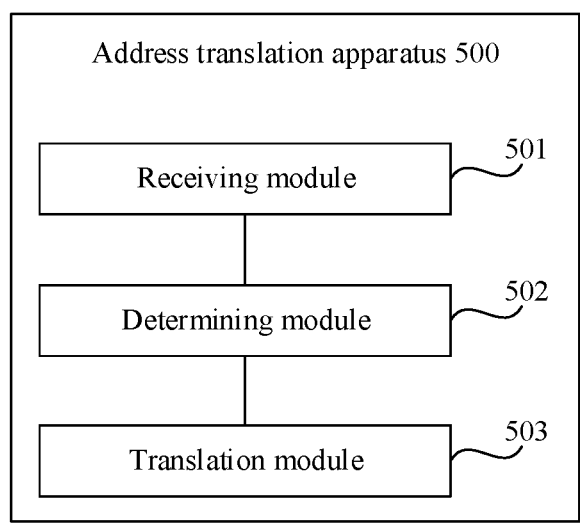
FIG. 5 is a block diagram of an address translation apparatus according to an embodiment of this disclosure.

FIG. 5 is a schematic diagram of an address translation apparatus according to an embodiment of this disclosure. The address translation apparatus is applied to a first ATU. As shown in FIG. 5, the apparatus 500 includes a receiving module 501, a determining module 502, and a translation module 503.

The receiving module 501 is configured to perform step 301 in the embodiment in FIG. 3. The first ATU is any one of at least one ATU deployed on a SoC. The SoC is connected to a processor by using a PCIe bus. At least one VM runs on the processor. A first VM is any one of the at least one VM. At least one VF is allocated to each VM in the PCIe bus. A BAR address interval corresponding to each VF corresponds to a segment of an address interval in a register of the SoC. The BAR address interval corresponding to each VF includes at least one region. A first address is a to-be-accessed destination address of the first VM. The to-be-accessed destination address is an address in a BAR address segment managed by the processor. Parameter information of the first address includes an identifier of the target VF. The target VF is one of at least one VF allocated to the first VM in the PCIe bus.

The determining module 502 is configured to perform step 302 in the embodiment in FIG. 3. An address mapping table includes VF range description information, and the VF range description information is used to describe attributes of at least two VFs.

The translation module 503 is configured to when it is determined that the identifier of the target VF and the VF range description information are successfully matched, perform step 303 in the embodiment in FIG. 3.

Optionally, the at least two VFs have consecutive numbers. The VF range description information includes a VF start identifier and a VF quantity. The VF start identifier is a smallest number in the at least two numbers corresponding to the at least two VFs, and the VF quantity is a quantity of the at least two VFs.

The determining module 502 is specifically configured to:

when the identifier of the target VF is greater than or equal to the VF start identifier and is less than a sum of the VF start identifier and the VF quantity, determine that the identifier of the target VF and the VF range description information are successfully matched.

Optionally, the VF range description information includes an identifier of each of the at least two VFs.

The determining module 502 is specifically configured to:

when the identifier of the target VF is an identifier in the VF range description information, determine that the identifier of the target VF and the VF range description information are successfully matched.

Optionally, the parameter information of the first address further includes a region identifier, the region identifier is used to indicate a region of the first address, the address mapping table further includes region description information, the region description information is used to describe addresses in at least two regions, the at least two regions are in a one-to-one correspondence with the at least two VFs, and the first ATU is configured to translate the addresses in the at least two regions.

The translation module 503 is further configured to: when it is determined that the region identifier and the region description information are successfully matched, translate the first address into a second address based on the address mapping table.

Optionally, the at least two regions have a same size. Each region has a same start address. The region description information includes a region size, a first start address, a PF identifier, and an identifier of a BAR address interval. The region size is a size of any one of the at least two regions, and the first start address is a start address of any one of the at least two regions. The region identifier includes an identifier of a target PF and an identifier of a target BAR address interval. The target PF is a PF to which the target VF belongs, and the target BAR address interval is a BAR address interval to which the first address belongs.

The determining module 502 is specifically configured to:

when the identifier of the target PF is the same as the PF identifier in the region description information, the identifier of the target BAR address interval is the same as the identifier of the BAR address interval in the region description information, and the first address is greater than or equal to the first start address and is less than or equal to a sum of the first start address and the region size, determine that the region identifier and the region description information are successfully matched.

Optionally, the address mapping table further includes a second start address, and the second start address is a start address of the register on the SoC side when the first ATU performs address translation.

The translation module 503 includes:

a determining unit, configured to determine an address difference between the second address and the second start address based on the address mapping table, the parameter information of the first address, and the first address; and an addition unit, configured to add the determined address difference and the second start address, to obtain the second address.

Optionally, the determining unit is specifically configured to:

determine the address difference based on the address mapping table, the parameter information of the first address, and the first address by using a preset formula. The preset formula is $\Delta=(IA-BAR\_OFFSET)+(VF\_ID-VF\_START)\times SIZE$.

$\Delta$ is the address difference, IA is the first address, BAR_OFFSET is the first start address in the region description information of the address mapping table, VF_ID is the identifier of the target VF, and VF_START is the VF start identifier in the VF range description information.

Optionally, the apparatus 500 further includes a receiving module 501.

The receiving module 501 is configured to receive and store the address mapping table. The address mapping table is determined by the processor during initialization based on the region included in the BAR address interval corresponding to each VF and a mapping address that is of the region in the SoC and that is included in the BAR address interval corresponding to each VF.

In this disclosure, the first ATU receives an access request sent by the first VM. The access request carries the first address and the parameter information of the first address. The parameter information of the first address includes the identifier of the target VF. The first ATU determines a matching relationship based on the parameter information of the first address and the VF range description information in the address mapping table. When the identifier of the target VF and the VF range description information are successfully matched, the first ATU translates the first address into the second address based on the address mapping table. Because the VF range description information is used to describe the attributes of the at least two VFs, in this embodiment of this disclosure, the first ATU may translate addresses in BAR address intervals corresponding to the at least two VFs, instead of translating only an address in a BAR address interval corresponding to a VF. Therefore, according to the address translation method provided in this disclosure, a quantity of ATUs deployed on an endpoint can be reduced, and resource waste and low message processing can be avoided in an ATU implementation process.

It should be noted that, when the address translation apparatus provided in the foregoing embodiment performs address translation, division of the foregoing functional modules is merely used as an example for description. In actual application, the foregoing functions may be allocated by different functional modules based on a requirement, in other words, an internal structure of address translation is divided into different functional modules, to implement all or some of the foregoing functions. In addition, the address translation apparatus provided in the foregoing embodiment and the address translation method embodiment belong to a same concept. For a specific implementation process of the address translation apparatus, refer to the method embodiment. Details are not described herein again.

In an embodiment of this disclosure, an address translation system is further provided. The system includes a processor and a SoC. The SoC is connected to the processor by using a PCIe bus. The SoC includes a first address translation unit. When the system runs, the first ATU may perform operation steps of the address translation method provided in the foregoing embodiment. The processor and the SoC may be the processor and the SoC in the embodiment in FIG. 1, or may be the processor and the SoC in the embodiment in FIG. 2.

In an embodiment of this disclosure, a SoC is further provided. The SoC is connected to the processor by using a PCIe bus, the SoC includes a first address translation unit, and a first ATU is configured to perform operation steps of the address translation method provided in the foregoing embodiments. The processor and the SoC may be the processor and the SoC in the embodiment in FIG. 1, or may be the processor and the SoC in the embodiment in FIG. 2.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of this disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely embodiments of this disclosure, but are not intended to limit this disclosure. Any modification, equivalent replacement, or improvement made without departing from the spirit and principle of this disclosure should fall within the protection scope of this disclosure.

What is claimed is:

1. An address translation method, wherein the method is implemented by a first address translation unit (ATU) in a system on chip (SoC) and comprises:
   receiving an access request, wherein the access request is sent by a first virtual machine (VM), the access request carries a first address and parameter information of the first address;
   identifying a matching relationship based on the parameter information of the first address and an address mapping table, wherein the address mapping table comprises virtual function (VF) range description which is used to describe attributes of at least two VFs;
   determining that an identifier of a target VF and the VF range description information are matched; and translating the first address into a second address based on the address mapping table, wherein the second address is a mapping address of the first address in the SoC.

2. The method of claim 1, wherein the first ATU is any one of at least one ATU deployed on the SoC, the SoC is connected to a processor by using a peripheral component interconnect express (PCIe) bus; at least one VM runs on the processor, the first VM is any one of the at least one VM, at least one VF is allocated to each VM in the PCIe bus, a base address register (BAR) address interval corresponding to each VF corresponds to a segment of address interval in a register of the SoC, the BAR address interval corresponding to each VF comprises at least one region, the first address is a to-be-accessed destination address of the first VM, the to-be-accessed destination address is an address in a BAR address segment managed by the processor, the parameter information of the first address comprises the identifier of the target VF, and the target VF is one of the at least one VF allocated to the first VM in the PCIe bus.

3. The method of claim 1, wherein the at least two VFs have consecutive numbers, the VF range description information comprises a VF start identifier and a VF quantity, the VF start identifier is a smallest number in at least two numbers corresponding to the at least two VFs, and the VF quantity is a quantity of the at least two VFs; and
the determining that the identifier of the target VF and the VF range description information are matched comprises:
when the identifier of the target VF is greater than or equal to the VF start identifier and is less than a sum of the VF start identifier and the VF quantity, determining that the identifier of the target VF and the VF range description information are matched.

4. The method of claim 1, wherein the VF range description information comprises an identifier of each of the at least two VFs; and
the determining that the identifier of the target VF and the VF range description information are matched comprises:
when the identifier of the target VF is the identifier in the VF range description information, determining that the identifier of the target VF and the VF range description information are matched.

5. The method of claim 1, wherein the parameter information of the first address further comprises a region identifier, the region identifier is used to indicate a region of the first address, the address mapping table further comprises region description information, the region description information is used to describe addresses in at least two regions, the at least two regions are in a one-to-one correspondence with the at least two VFs, and the first ATU is configured to translate the addresses in the at least two regions; and before the translating the first address into the second address based on the address mapping table, the method further comprises:
determining that the region identifier and the region description information are matched; and
translating the first address into the second address based on the address mapping table.

6. The method of claim 5, wherein the at least two regions have a same size, each region has a same start address, the region description information comprises a region size, a first start address, a physical function (PF) identifier, and an identifier of a base address register (BAR) address interval, the region size is a size of any one of the at least two regions, the first start address is a start address of any one of the at least two regions, the region identifier comprises an identifier of a target PF and an identifier of a target BAR address interval, the target PF is a PF to which the target VF belongs, and the target BAR address interval is a BAR address interval to which the first address belongs; and
the determining that the region identifier and the region description information are matched comprises:
when the identifier of the target PF is the same as the PF identifier in the region description information, the identifier of the target BAR address interval is the same as the identifier of the BAR address interval in the region description information, and the first address is greater than or equal to the first start address and is less than or equal to a sum of the first start address and the region size, determining that the region identifier and the region description information are matched.

7. The method of claim 1, wherein the address mapping table further comprises a second start address, and the second start address is a start address of a register on a SoC side when the first ATU performs address translation; and
the translating the first address into the second address based on the address mapping table comprises:
identifying an address difference between the second address and the second start address based on the address mapping table, the parameter information of the first address, and the first address; and
adding the determined address difference and the second start address, to obtain the second address.

8. The method of claim 7, wherein the identifying the address difference between the second address and the second start address based on the address mapping table, the parameter information of the first address, and the first address comprises:
identifying the address difference based on the address mapping table, the parameter information of the first address, and the first address by using a preset formula, wherein the preset formula is $\Delta=(IA-BAR\_OFFSET)+(VF\_ID-VF\_START)\times SIZE$, wherein
$\Delta$ is the address difference, IA is the first address, BAR_OFFSET is the first start address in the region description information of the address mapping table, VF_ID is the identifier of the target VF, and VF_START is the VF start identifier in the VF range description information.

9. The method of claim 2, wherein the method further comprises:
receiving and storing the address mapping table, wherein the address mapping table is determined by the processor during initialization based on the region comprised in the BAR address interval corresponding to each VF and a mapping address that is of the region in the SoC and that is comprised in the BAR address interval corresponding to each VF.

10. A system on chip (SoC), wherein the SoC is connected to a processor by using a peripheral component interconnect express (PCIe) bus, the SoC comprises a first address translation unit (ATU), and the first ATU is configured to:
receive an access request, wherein the access request is sent by a first virtual machine (VM), the access request carries a first address and parameter information of the first address;
identify a matching relationship based on the parameter information of the first address and an address mapping table, wherein the address mapping table comprises virtual function (VF) range description which is used to describe attributes of at least two VFs;
determining that an identifier of a target VF and the VF range description information are matched; and translating the first address into a second address based on the address mapping table, wherein the second address is a mapping address of the first address in the SoC.

11. The SoC of claim 10, wherein the first ATU is any one of at least one ATU deployed on the SoC; at least one VM runs on the processor, the first VM is any one of the at least one VM, at least one VF is allocated to each VM in the PCIe bus, a base address register (BAR) address interval corresponding to each VF corresponds to a segment of address interval in a register of the SoC, the BAR address interval corresponding to each VF comprises at least one region, the first address is a to-be-accessed destination address of the first VM, the to-be-accessed destination address is an address in a BAR address segment managed by the processor, the parameter information of the first address comprises the identifier of the target VF, and the target VF is one of the at least one VF allocated to the first VM in the PCIe bus.

12. The SoC of claim 10, wherein the at least two VFs have consecutive numbers, the VF range description information comprises a VF start identifier and a VF quantity, the VF start identifier is a smallest number in at least two numbers corresponding to the at least two VFs, and the VF quantity is a quantity of the at least two VFs; and
the first ATU is configured to:
determine that the identifier of the target VF and the VF range description information are matched, when the identifier of the target VF is greater than or equal to the VF start identifier and is less than a sum of the VF start identifier and the VF quantity.

13. The SoC of claim 10, wherein the VF range description information comprises an identifier of each of the at least two VFs; and
the SoC is further configured to:
when the identifier of the target VF is the identifier in the VF range description information, determine that the identifier of the target VF and the VF range description information are matched.

14. The SoC of claim 10, wherein the parameter information of the first address further comprises a region identifier, the region identifier is used to indicate a region of the first address, the address mapping table further comprises region description information, the region description information is used to describe addresses in at least two regions, the at least two regions are in a one-to-one correspondence with the at least two VFs, and the first ATU is configured to:
determining that the region identifier and the region description information are matched; and
translating the first address into the second address based on the address mapping table.

15. The SoC of claim 14, wherein the at least two regions have a same size, each region has a same start address, the region description information comprises a region size, a first start address, a physical function (PF) identifier, and an identifier of a base address register (BAR) address interval, the region size is a size of any one of the at least two regions, the first start address is a start address of any one of the at least two regions, the region identifier comprises an identifier of a target PF and an identifier of a target BAR address interval, the target PF is a PF to which the target VF belongs, and the target BAR address interval is a BAR address interval to which the first address belongs; and
the first ATU is further configured to:
when the identifier of the target PF is the same as the PF identifier in the region description information, the identifier of the target BAR address interval is the same as the identifier of the BAR address interval in the region description information, and the first address is greater than or equal to the first start address and is less than or equal to a sum of the first start address and the region size, determine that the region identifier and the region description information are matched.

16. The SoC of claim 10, wherein the address mapping table further comprises a second start address, and the second start address is a start address of a register on a SoC side when the first ATU performs address translation; and
the first ATU is further configured to:
identify an address difference between the second address and the second start address based on the address mapping table, the parameter information of the first address, and the first address; and
add the determined address difference and the second start address, to obtain the second address.

17. The SoC of claim 16, wherein the first ATU is further configured to:
identify the address difference based on the address mapping table, the parameter information of the first address, and the first address by using a preset formula, wherein the preset formula is $\Delta=(IA-BAR\_OFFSET)+(VF\_ID-VF\_START)\times SIZE$, wherein
$\Delta$ is the address difference, IA is the first address, BAR_OFFSET is the first start address in the region description information of the address mapping table, VF_ID is the identifier of the target VF, and VF_START is the VF start identifier in the VF range description information.

18. The SoC of claim 11, wherein the first ATU is further configured to:
receive and store the address mapping table, wherein the address mapping table is determined by the processor during initialization based on the region comprised in the BAR address interval corresponding to each VF and a mapping address that is of the region in the SoC and that is comprised in the BAR address interval corresponding to each VF.

19. A non-transitory computer-readable storage medium comprising instructions which, when executed by a computer, cause the computer to carry out steps:
receiving an access request, wherein the access request is sent by a first virtual machine (VM), the access request carries a first address and parameter information of the first address;
identifying a matching relationship based on the parameter information of the first address and an address mapping table, wherein the address mapping table comprises virtual function (VF) range description which is used to describe attributes of at least two VFs;
determining that an identifier of a target VF and the VF range description information are matched; and
translating the first address into a second address based on the address mapping table, wherein the second address is a mapping address of the first address in a system on chip SoC).

20. The non-transitory computer-readable storage medium of claim 19, wherein the instructions are implemented by a first address translation unit (ATU) in the SoC, the first ATU is any one of at least one ATU deployed on the SoC, the SoC is connected to a processor in the computer by using a peripheral component interconnect express (PCIe) bus; at least one VM runs on the processor, the first VM is any one of the at least one VM, at least one VF is allocated to each VM in the PCIe bus, a base address register (BAR) address interval corresponding to each VF corresponds to a segment of address interval in a register of the SoC, the BAR address interval corresponding to each VF comprises at least one region, the first address is a to-be-accessed destination address of the first VM, the to-be-accessed destination address is an address in a BAR address segment managed by the processor, the parameter information of the first address comprises the identifier of the target VF, and the target VF is one of the at least one VF allocated to the first VM in the PCIe bus.

* * * * *